United States Patent [19]

Müller et al.

[11] 4,172,220

[45] Oct. 23, 1979

[54] SETTING DEVICE FOR PRESETTABLE COUNTERS

[75] Inventors: Helmuth Müller, St. Georgen; Lothar Herrmann, Hornberg, both of Fed. Rep. of Germany

[73] Assignee: Kienzle Apparate GmbH, Villingen-Schwenningen, Fed. Rep. of Germany

[21] Appl. No.: 839,842

[22] Filed: Oct. 6, 1977

[30] Foreign Application Priority Data

Oct. 19, 1976 [DE] Fed. Rep. of Germany ....... 2647127

[51] Int. Cl.[2] ........................ B67D 5/22; G06C 15/42; G06F 15/18

[52] U.S. Cl. .................................. 235/94 R; 235/1 C; 235/117 A; 235/132 R; 235/144 SP

[58] Field of Search ......... 235/144 SP, 144 B, 117 A, 235/1 C, 94 R, 132 R

[56] References Cited

U.S. PATENT DOCUMENTS

| | | | |
|---|---|---|---|
| 1,032,486 | 7/1912 | Lynch | 235/144 SP |
| 3,022,942 | 2/1962 | Van Veen | 235/117 A |
| 3,131,861 | 5/1964 | Krebsdzio | 235/144 SP |
| 3,453,420 | 7/1969 | Freese et al. | 235/132 R |
| 4,005,819 | 2/1977 | De Lille et al. | 235/132 R |

FOREIGN PATENT DOCUMENTS

| | | | |
|---|---|---|---|
| 1207119 | 12/1965 | Fed. Rep. of Germany | 235/144 SP |
| 1524582 | 3/1966 | Fed. Rep. of Germany | 235/144 SP |
| 2157763 | 11/1971 | Fed. Rep. of Germany | 235/142 |

*Primary Examiner*—Stephen J. Tomsky

*Attorney, Agent, or Firm*—Toren, McGeady and Stanger

[57] ABSTRACT

In a setting device for presettable counters, a number of indicating rollers are arranged with symbols on their circumferential peripheral surfaces. Connected to each indicating roller is a ratchet wheel and an adjusting wheel. A switching device for each roller permits it to be moved in a step-by-step manner and otherwise to be locked in position. The switching device includes a switching pawl for engaging the ratchet wheel and moving the roller, a fixing lever for locking the adjusting wheel and roller in position, a control pawl and a key for displacing the control pawl. The control pawl is spring-biased against the actuating movement of the key. The control pawl displaces the switching pawl and the fixing lever in response to its displacement by the key.

12 Claims, 4 Drawing Figures

SETTING DEVICE FOR PRESETTABLE COUNTERS

FIELD OF THE INVENTION

The invention relates to a setting device for presettable counters having indicating rollers which may be set in a step by step manner to a predetermined angular position by means of manually actuated keys.

BACKGROUND OF THE INVENTION

A presettable counter with indicating rollers generally serves to issue once or as many times as desired via suitable presetting means a preset quantity for instance at a liquid dispensing station. Such presettable counters are mostly used in combination with a quantity counter in such manner that the quantity counter counts the quantity delivered starting at zero counting position while the presettable counter is driven in the reverse direction in synchronism with the quantity counter from the preset position to zero position U.S. Pat. No. 3,031,103). Most devices of this kind are of such design that whenever the desired quantity is preset right from the beginning of the delivery, the presetting means can no longer be operated due to a locking device. When the quantity to be delivered gradually assumes the preset value a valve, by being gradually operated, reduces the quantity flow and is completely closed as soon as the preset volume has been reached. The locking device which was effective during the delivery then releases the presetting device so that selectively the delivery process can be repeated with the same preset quantity or a new quantity to be delivered can be preset. This device is disadvantageous in that for moving the presettable indicating roller to its preset position the switching lever is manually actuated to produce the kinetic energy and directly and positively engages the setting wheel which is in the shape of a ratchet wheel. This means that the presettable counter in order to be preset must be designed to be resistant to all sorts of mechanical action, while also being resistant to heavy blows in order to be able to function under all circumstances. When considerable force is exerted on the indicating rollers in being switched in a step by step manner, they tend to overthrow. In that case damages to the switching pawl and the ratchet wheel are practically unavoidable so that the presetting device may become inoperative.

In another known presettable counter, as disclosed in DAS No. 1,207,119 the setting means for the presettable counters are in the form of slides or key shafts to be moved backwards and forwards and they are provided with pivoting pawls in direct engagement with the toothing of the ratchet wheel. When the key returns to its initial position the switching pawl, which is drawn by a spring to a stop bolt, can evade by overcoming the spring action. In order to make sure that during the delivery process the mechanical operation within the counter is neither disturbed nor blocked by the operation of the keys in the known device the shafts of the presetting keys cooperate with locking means which are out of engagement only when the resetting means of the counter mechanism is operated.

It is obviously disadvantageous to apply the setting energy directly to the presettable indicating rollers. But the arrangement of a locking device in connection with the key shafts which at least avoids an erroneous actuation of the keys and thereby damage to the counter brings about an additional risk. For instance, by a wrong operation of the setting device of the counter by violently actuating the keys in their locked condition under the impression that the keys can only be operated by applying heavy force, considerable damage can be applied to the mechanical parts of the presettable counter.

In DAS No. 1,524,582 a setting device for a presettable counter has been described in which the switching pawl is arranged to be tilted in order to avoid detrimental effects to the counter at least as long as the setting device is in its locked state. To this end the switching pawl is mounted on a pivotal bracket which temporarily moves the switching pawl out of engagement with the ratchet wheel by means of a sliding lever connection. Apart from the fact that the switching pawl is ineffective in its locked state the full setting energy will be applied undamped to the presetting roller due to a direct engagement between the key and the toothing of the setting wheel. When the presetting energy is applied to the switching pawl and the ratchet wheel by a heavy blow, for instance by a violent actuation of the key, the indicating roller tends to overthrow or there is a risk that the mechanical connections are destroyed. Therefore, also with this known presetting device it is not made sure that for each operation of the key the corresponding indicating roller of the presettable counter is moved by one step and thereby one indicating position only.

SUMMARY OF THE INVENTION

The present invention, therefore, provides a setting device for presettable counters for moving rotatable indicating rollers to definite angular positions, for instance, to indicating positions representing a whole number, by means of manually actuatable setting means so that any direct influence between the setting means and the indicating roller being set is avoided.

Therefore, the invention proposes a setting device for presettable counters having indicating rollers to be set in a step by step manner to a predetermined angular position by means of manually actuated keys, wherein each manually actuated key operates a pivotally mounted control pawl which is biased by a spring against the setting movement and wherein an independently actuatable setting device is arranged to be influenced by the control pawl to carry out a switching step at the indicating roller. The control pawl acts as a coupling member between the key and the switching device so that the setting and resetting movements of the key and the corresponding positions of the control pawl, the setting device moves between a locked state and a switching state.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
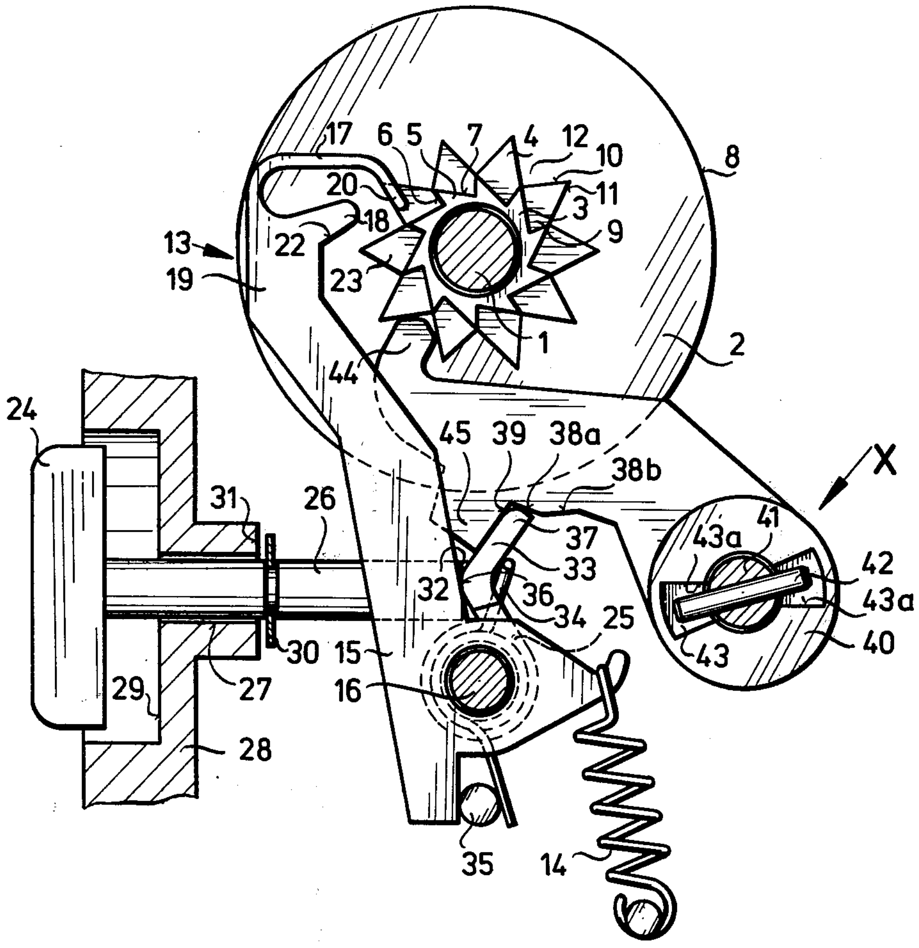
FIG. 1 is a diagrammatic representation of a part of a presettable counter embodying the invention, illustrating one indicating roller in its presettable basic position.
Figure 2:
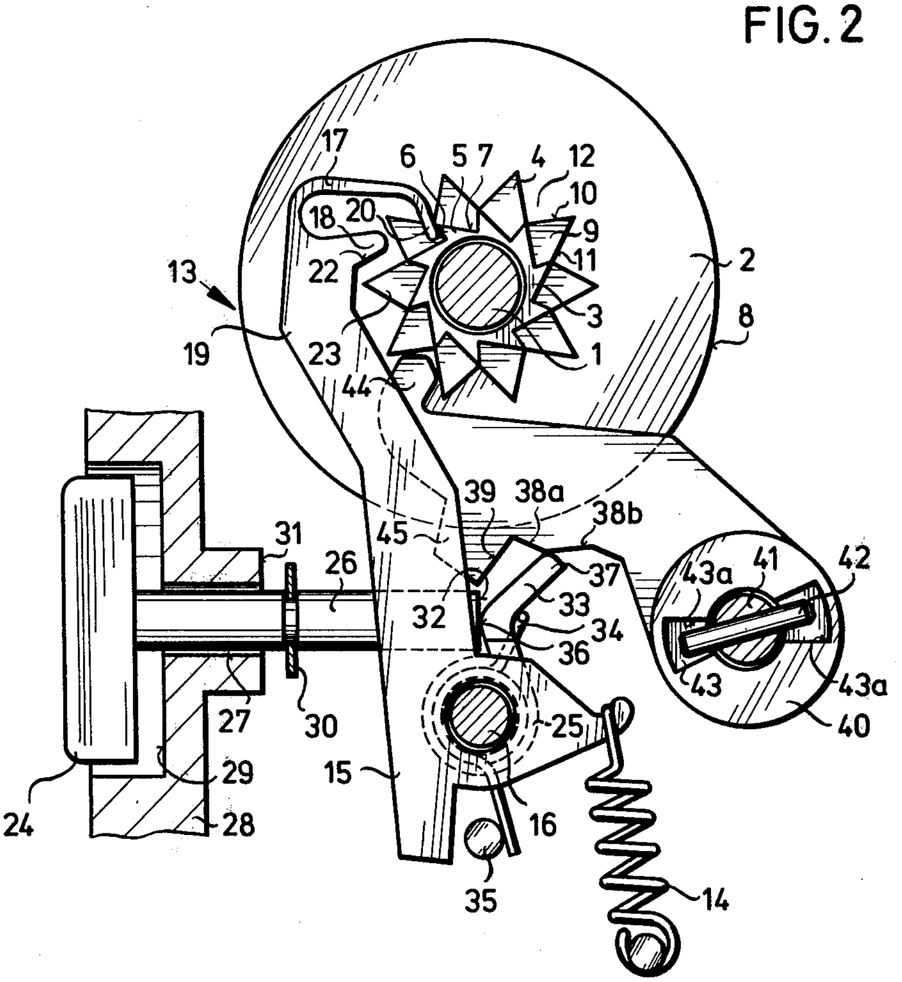
FIG. 2 is a view similar to FIG. 1 illustrating the control pawl displaced, permitting the switching pawl to be moved by key operation to engage the switching wheel while retaining the adjusting and fixing lever in the locking position.
Figure 3:
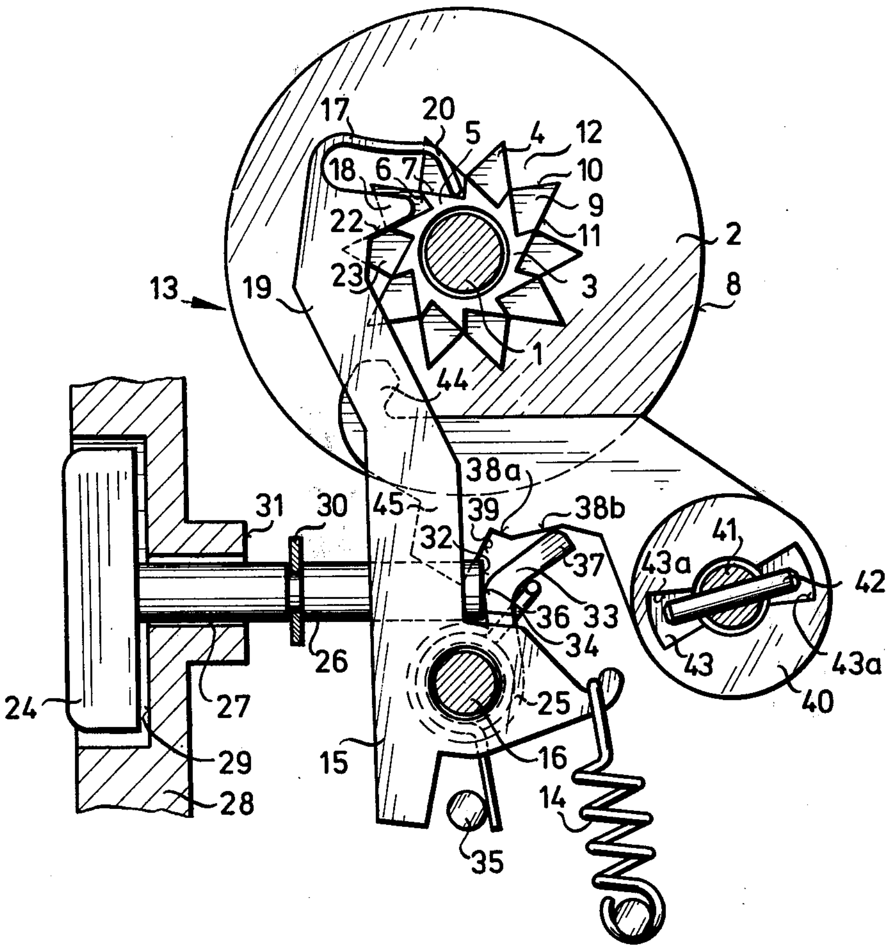
FIG. 3 is a view similar to FIGS. 1 and 2 after the control pawl has released the adjusting and fixing lever allowing the indicating roller to make its presetting angular movement under the control of the key.

A counter of the above described kind consists of a number of indicating rollers rotatably arranged on a common shaft 1 each roller 2 being individually settable to a desired value, the so-called presetting. FIGS. 1 to 3 are a simplified representation of one step in the movement of a presettable counter. Connected to each indicating roller 2 is a ratchet wheel 3 and an adjusting and fixing wheel 4. The shape of each tooth 5 of the ratchet wheel 3 is shown to have an essentially radially disposed flank 6 as an engaging surface for the switching movement and a gradually sloping back flank 7 which serves as a stop limiting the angular distance through which it is moved. The ratchet wheel 3 and the indicating roller 2 are arranged at a predetermined angular position with respect to each other which depends on the arrangement of the switching pawl. Also, of course, the symbols to be indicated which are arranged on the circumferential peripheral surface 8 of the indicating roller 2 and the adjusting and fixing wheel 4 are at a predetermined position to each other. The adjusting and fixing wheel 4 has as many teeth, disposed radially outwardly of the teeth on the ratchet wheel as corresponds to the number of symbols shown by indicating roller 2 with each individual tooth 9 being formed by two flanks 10 and 11 crossing at an acute angle so that tooth gaps 12 are provided between adjacent teeth, which results in an equal adjusting effect in the two directions of rotation.

Besides the parts to be switched, the switching device 13 comprises the switching parts producing the switching movement. The indicating roller 2 is switched or moved by an independently movable switching pawl 15 which is biased in the moving direction by a spring 14 and is rotatably mounted on a fixed shaft 16. At its end 19 spaced more remotely from the shaft, the pawl 15 is provided with two projections 17 and 18, spaced from one another. The outer one of the projections 17 is elastic and engages, by means of its inwardly inclined end or point 20, the ratchet wheel 3. Due to a constant torque applied by the spring 14 on the switching pawl 15, when the pawl point 20 contacts the radially arranged flank 6 of the tooth 5 it moves the indicating roller 2 by one step in clockwise direction (FIG. 2) when the indicating roller 2 is free to do so. The angular distance through which the switching pawl is moved is defined by a stop surface 22 on the rigid other projection 18 of the switching pawl which, simultaneously with the angular motion, dips into a tooth gap 23 on the ratchet wheel 3 limiting the movement thereof by cooperation with a back flank 7 of one of the ratchet wheel teeth 5 (FIG. 3).

The independently movable switching device is exclusively operated by the actuating movement of a manually actuated pressure key 24 which influences a control pawl 25 which is biased under spring action against the actuating movement. Further, the key may be operated by electromagnetic or pneumatic means. The pressure key 24 includes a key shaft 26 in an elongated guide bore 27 of a housing wall 28 through which it is axially displaceable. The actuating movement of the pressure key 24 is limited by a stop surface 29 in a recessed housing wall 28. The outward movement of the pressure key 24 is limited by a locking ring 30 on the key shaft 26 which cooperates with the internal rim 31 of the wall.

The front face 32 of the key shaft, that is, the end remote from the key, cooperates with an arm 33 bent off at an angle from the control pawl 25. A torsion spring 34 works in counterclockwise direction as viewed in the drawings and rests with one end against a fixed stop 35 and its other end bears against the arm 33 on the control pawl 25 so that a bent-off, rounded part 36 continuously contacts the front face 32 of the key shaft 26. Besides other objects, the spring 34 serves to reset the pressure key 24 to its initial position shown in FIG. 1.

The projecting or free end 37 of the arm 33 cooperates with functional or cam surfaces 38a, 38b and 39 on a pivotally mounted adjusting and fixing lever 40 providing a sliding leverage to control the fixing lever 40. Functional surface 39 is arranged to exert an adjusting torque to the adjusting and fixing lever 40 via the arm 33. In the course of the motion of the setting device 13, as the indicating roller is being moved, the functional or cam surfaces 38a and 38b assure safe engagement of the pawl 15 with the ratchet wheel 3 before the indicating roller 2 is moved by the continued movement of the key after roller 2 has been released. Adjusting and fixing lever 40 is loosely mounted on a control shaft 41 to be pivoted through a certain angular distance. At one end it is provided with a wedge shaped pawl point 44 which can be displaced into and out of engagement with gaps between the teeth of the adjusting wheel 4. Apart from being under control of the control pawl 25, the adjusting and fixing level 40 is additionally adjusted by a pin and slot connection 42,43 from the control shaft 41. Such a pivotal movement is applied to the control shaft 41 immediately at the beginning of each delivery process and is maintained until such delivery process has been completely finished. Since the pin 42 through the control shaft 41 rests against the wall 43a of the slot 43, the fixing lever 40 is positively brought into engagement with the adjusting and fixing wheel 4 so that the indicating roller 2 is locked. Any actuation of the pressure key 24 is therefore without effect. The adjustment and fixing lever 40 generally serves to position and maintain in position the indicating roller 2 at the desired figure in the sense that during each delivery process the position of the indicating roller remains unchanged.

When a certain figure has to be preset, the parts are in the position as shown in FIG. 1. The control pawl 25 is biased by torsion spring 34 in counterclockwise direction. The bent-off arm 33 is of such a dimension in the axial direction of the fixed shaft 16 that it is in the range of the switching pawl 15, of the end of the key shaft 26 as well as of the adjustment and fixing lever 40 so that it acts as a control bracket safeguarding the interdependence of the individual parts. As a control bracket, the arm 33 of the control pawl 25 keeps the switching pawl 15, coaxially mounted with the control pawl on the fixed shaft 16, in a dependent functional position. To achieve this condition the torsion spring 34 exerts a higher torque than the driving spring 14 which biases the switching pawl 15.

Apart from the differing torques they exert, the shape of the springs 14,34 is of no practical importance. This means that instead of a spiral 14, a torsion spring can be applied as long as this torsion spring has a correspondingly dimensioned torque with respect to the resetting spring 34. The resetting torque exerted by the arm 33 in cooperation with the sliding surface 39 makes sure that the indicating roller 2 is secured in an adjusted position without any play. Simultaneously it locks the indicating roller 2 against any undesired or violent rotation by cooperation with the sliding or cam surfaces 38*a*, 38*b* on the fixing lever 40. As a coupling member the arm 33 of the control pawl 25 provides an operative connection to the pressure key 24 via the juxtaposed sliding surfaces 36,32 on the parts 25,26.

FIG. 2 shows an intermediate position in the course of one setting operation or step. In the course of the movement of the key 24 the projection 17 on pawl 15 following its driving spring 14 contacts a flank 6 of one of the switching tooth 5 so that the torque of spring 14 is applied to the ratchet wheel 3. Due to a corresponding position of the control pawl 25, the adjusting and fixing lever 40 cannot be released from its fixing position with respect to the adjusting and fixing wheel 4 as long as the control pawl 25 has not left the sliding surface 38*a* by a continued rotation in clockwise direction. Only when the key 24 has been completely depressed (FIG. 3), the adjusting and fixing lever 40 is released from its fixing position with respect to the indicating roller 2. The indicating roller 2 is then rotated by the switching pawl 15 through a distance limited by the projection 18. An overthrowing in this angular stepwise movement is for once avoided by the projection 18 serving as a stop. On the other hand, the switching is effected with always the same switching torque adapted to the demand of the indicating roller so that it is never unduly accelerated in an overthrowing action.

When the pressure key 24 is released from the inner position displayed in FIG. 3, the switching pawl 15 is at first still in engagement with the ratchet wheel 3. Under the effect of the torsion spring 34, the control pawl 25 moves toward the position shown in FIG. 1 so that through the sliding contact with the functional or cam surface 38*a* is reestablished and the pawl point 44 of the adjusting and fixing lever 40 is moved into the adjusting and fixing wheel 4 and provides a position for the indicating roller 2 and the fixing lever. Thereafter the control pawl 25 contacts the switching pawl 15 and the two pawls 25 and 15 are retracted to the initial position in FIG. 1 along with the control key 24. During this movement the torsion spring 34 acts on control pawl 25. The position in FIG. 1 is achieved when the control pawl 25 presses against the sliding cam surface 39 on arm 45 of the fixing lever 40 so that the indicating roller 2 is arrested without gear play.

Figure 1A:
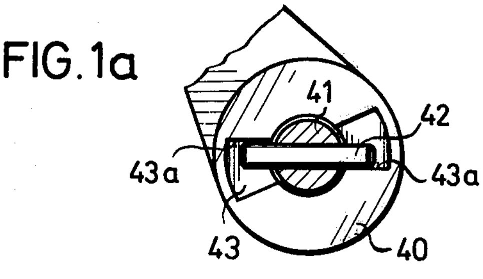
FIG. 1a is a detail view designated by an X in FIG. 1 with an adjusting and locking lever fixed in its locked position by a control shaft.

Additionally, the indicating roller 2 is fixed against angular displacement during any counting process in that the control shaft 41 presses its pin 42 in clockwise direction positively against the wall 43*a* of the slot 43 (FIG. 1*a*). As a result, the adjusting and fixing lever 40 is positively locked in engaging position and, in turn, locks the adjusting and fixing wheel 4 and the indicating roller 2 via its pawl point 44.

The special advantage of the setting device as shown is that any unusual operation of the pressure key, especially any blows thereon, which may be exerted by manual actuation as well as by electromagnetic or pneumatic actuation is without any direct influence on the indicating roller. There is absolutely no risk that a modification of the data preset or a disturbance of the counting function may be exercised during a counting process by an unusual pressure exerted on the key. Due to the design of the control pawl 25 as a common control member with an exclusive operative connection between the presetting key and the indicating roller, any danger of destroying essential parts of the counter is greatly reduced. Mistakes in presetting due to manipulation are impossible, since the setting means belonging to an indicating roller are a completely independent switching device to be driven by separate actuating means so that the switching forces and the mechanical elements are always operating under the same conditions which are easily controllable. Due to the method shown it is also prevented that only part of a switching step is made since when the locking means are released only a complete switching step can be effected in a jumping manner. When the indicating roller is finally released by the adjusting and fixing lever, the control pawl has moved so far away from the switching pawl that this latter pawl can effect the switching of the indicating roller by one step following its own independent driving means without any interferences.

The solution as shown is also very simple in its design. It consists of few parts which can be simply produced and are in a safe driving connection with each other and allow for interaction with counters comprising several decades by arranging them in a side by side relationship.

While specific embodiments of the invention have been shown and described in detail to illustrate the application of the inventive principles, it will be understood that the invention may be embodied otherwise without departing from such principles.

What is claimed is:

1. Setting device for presettable counters comprising a plurality of indicating rollers arranged to be set in a step by step manner, an independently actuatable setting means for each said indicating roller, said setting means movable between a dependent position spaced from engagement with said indicating roller and a switching position in engagement with said indicating roller for moving said indicating roller in a step by step manner, a fixing means displaceable relative to said indicating roller between a fixing position locking said indicating roller and a release position permitting said indicating roller to be moved in a step by step manner, a pivotally mounted control pawl in contacting engagement with said setting means and said fixing means, spring means operatively connected to said control pawl for holding said control pawl in position for maintaining said setting means in the dependent position and said fixing means in the locking position, a movably displaceable key in contacting engagement with said control pawl for displacing said control pawl against the biasing action of said spring means acting on said control pawl so that in reaction to the movement of said key said control pawl releases said setting means for movement from the dependent position to the switching position and releases said fixing means for movement from the fixing position to the release position.

2. Setting device, as set forth in claim 1, wherein said indicating roller indludes a ratchet wheel connected thereto, said ratchet wheel having a plurality of teeth thereon with a gap formed between each pair of adjacent teeth, said setting means comprises a switching pawl arranged to engage said ratchet wheel in the switching position for moving said indicating roller, said switching pawl having a first projection and a second projection each arranged to engage said ratchet wheel, said first projection being elastic and arranged to drive said ratchet wheel and said indicating roller connected thereto, and said second projection arranged to engage one of said gaps in said ratchet wheel for limiting the angular movement of said ratchet wheel by said first projection.

3. Setting device, as set forth in claim 2, wherein said indicating roller includes a toothed adjusting wheel connected thereto, said fixing means comprises a pivotally mounted adjusting and fixing lever, said lever having a pawl point thereon, said lever disposed in contact with said control pawl and being releasable from the fixing position for movement to the release position by the pivotal movement of said control pawl, and said pawl point of said adjusting and fixing lever being movable into and out of engagement with said adjusting wheel in the fixing position and release position, respectively, so that in engagement with said adjusting wheel in the fixing position said pawl point prevents said adjusting wheel and said indicating roller connected thereto from rotational movement.

4. Setting device, as set forth in claim 2, including a fixed shaft spaced laterally from said indicating roller, and said control pawl and switching pawl being coaxially and rotatably mounted on said fixed shaft.

5. Setting device, as set forth in claim 3, wherein said key includes an axially extending key shaft, said control pawl includes an arm secured to and extending angularly from said control pawl, said spring means biasing said arm against said key shaft, said adjusting and fixing lever having cam surfaces thereon, said arm having a free end disposed in contact with one of said cam surfaces on said adjusting and fixing lever for securing said adjusting and fixing lever in the fixing position so that displacement of said key shaft in opposition to said spring means displaces the free end of said arm along the one of said cam surfaces of said adjusting and fixing lever for releasing said lever from engagement with said adjusting wheel.

6. Setting device, as set forth in claim 5, wherein in the dependent position of said setting means said arm of said control pawl is disposed in contact with said switching pawl and said switching pawl and adjusting and fixing lever are functionally dependent on the position of said control pawl for releasing step by step movement of said indicating roller.

7. Setting device, as set forth in claim 6, wherein said adjusting and fixing lever being located between said control pawl and said adjusting wheel, an arm on said adjusting and fixing lever extending into the path of said arm on said control pawl, and said spring means through said control pawl normally biasing said arm on said adjusting and fixing lever and thereby biasing the pawl point on said adjusting and fixing lever into the fixing position in engagement with said adjusting wheel so that said indicating roller is held in the fixed position without play.

8. Setting device, as set forth in claim 6, wherein said cam surfaces on said adjusting and fixing lever comprises a first control part and a second releasing part with the free end of said arm of said control pawl being displaceable along said first control part and said second releasing part so that with the free end of said arm in contact with said first control part said control pawl retains said adjusting and fixing lever in the fixed position in engagement with said adjusting wheel and with the free end of said arm in contact with said second releasing part said adjusting and fixing lever being pivotally displaceable into the release position for disengaging said pawl point thereon out of engagement with said adjusting wheel.

9. Setting device, as set forth in claim 1, wherein said spring means connected to said contact pawl comprising a torsion spring.

10. Setting device, as set forth in claim 2, wherein another spring means is connected to said switching pawl for biasing said switching pawl into the switching position with said first projection thereon biased into engagement with said ratchet wheel, said spring means connected to said control pawl having a greater spring force than said another spring means so that it overcomes the biasing action of said another spring means for retaining said switching lever in the dependent position preventing any switching movement of said indicating roller.

11. Setting device, as set forth in claim 3, wherein a control shaft is laterally spaced from said fixed shaft and pivotally mounts said adjusting and fixing lever, a pin extending through said control shaft transversely of the axis thereof, said adjusting and fixing lever having a slot formed therein on opposite sides of said control shaft with said pin extending outwardly from said control shaft into said slot on the opposite sides of said control shaft, and said adjusting and fixing lever being pivotally movable relative to said control shaft for the range of angular movement of said pin within said slot.

12. Setting means, as set forth in claim 5, including means mounted on said key shaft for limiting the axial movement of said key shaft.

* * * * *